Oct. 7, 1969　　　A. R. HOPKINS　　　3,470,581
APPARATUS FOR PROCESSING POULTRY WINGS
Filed April 6, 1967　　　5 Sheets-Sheet 1

Inventor
Arnold R. Hopkins
Pendleton, Neuman
Seibold & Williams
Att'ys

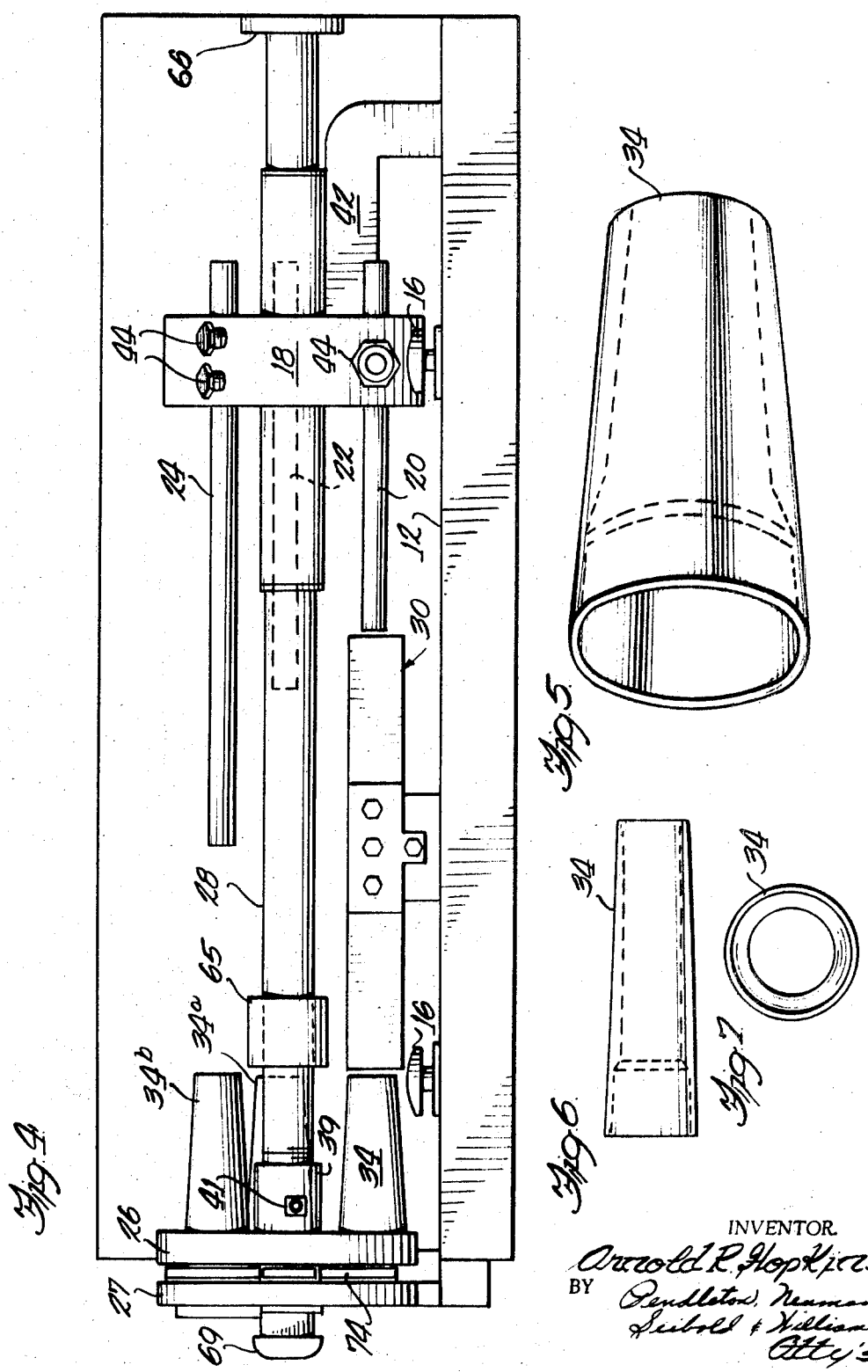

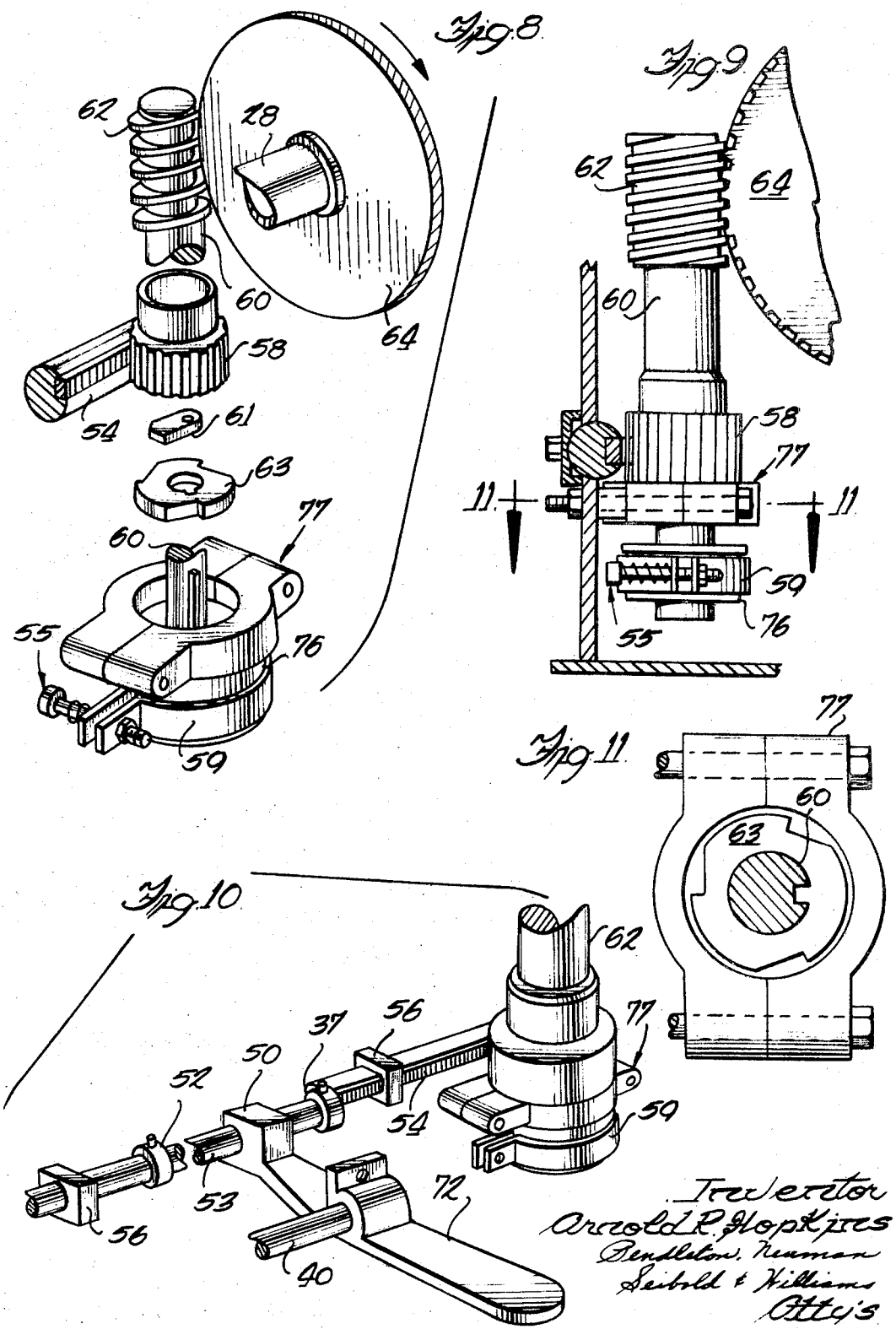

Oct. 7, 1969     A. R. HOPKINS     3,470,581
APPARATUS FOR PROCESSING POULTRY WINGS
Filed April 6, 1967     5 Sheets-Sheet 4
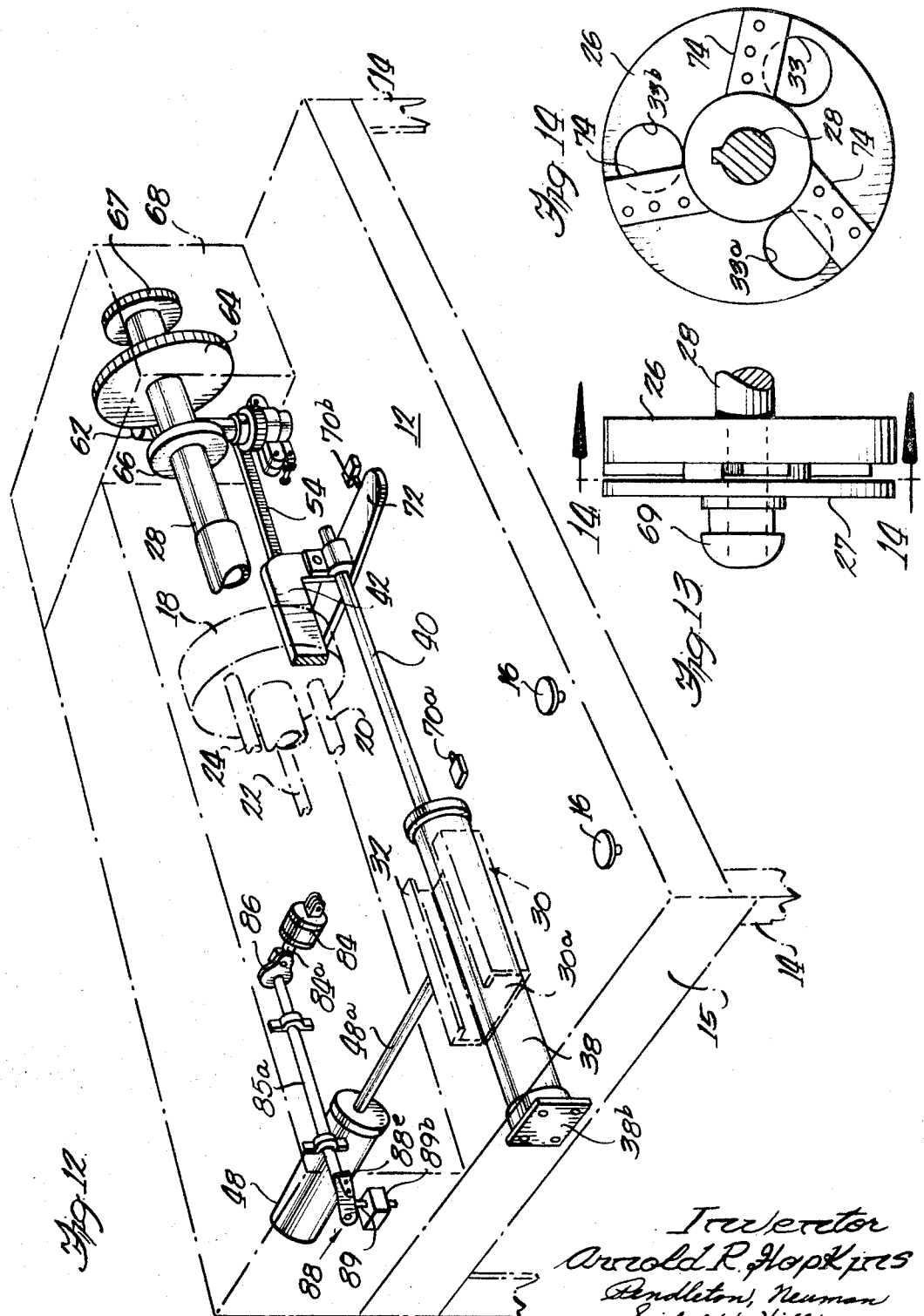

United States Patent Office 3,470,581
Patented Oct. 7, 1969

3,470,581
APPARATUS FOR PROCESSING POULTRY WINGS
Arnold R. Hopkins, P.O. Box 276,
Sandoval, Ill. 62882
Filed Apr. 6, 1967, Ser. No. 628,864
Int. Cl. A22c 21/00
U.S. Cl. 17—11                        15 Claims

ABSTRACT OF THE DISCLOSURE

A rotating turret plate is provided having spaced peripheral apertures, and has secured and aligned over such aperture tubes for receiving poultry wings. The tubes are also adapted to telescopically receive reciprocating elongate rams which force the wings within the tubes to extend varying distances from the opposite tube ends and through the turret. The turret has knife blocks secured thereto adjacent the apertures which coact with an adjacent stationary cutting plate apertured similarly to the turret. Movement of the turret relative to the cutting plate shears the portions of the poultry wings extending through the turret, from the wing portions within the tubes.

In the course of ram reciprocation and turret rotation, each poultry wing successively has the distal wing joint severed from the wing remainder, the meat of the intermediate wing joint scraped from the two bones of said joint into a flesh mass, the bones of the intermediate joint severed, and the proximal joint, initially attached to the poultry carcass, axially urged into the flesh mass whereby the flesh of the intermediate joint is rolled back and inverted over the proximal joint.

BACKGROUND OF THE INVENTION

Field of the invention

This invention relates to apparatus for processing poultry wings normally having a distal joint connected to a proximal joint containing a single bone by means of an intermediate joint having two bones. In the course of apparatus operation, the distal poultry wing joint is severed and discarded, and the flesh of the intermediate joint is scraped from the bones of the intermediate joint, which bones are then also severed and discarded; the flesh of the intermediate joint is then rolled back and inverted over the proximal joint.

Description of the prior art

The prior art has recognized the desirability of processing poultry wings whereby the meat thereof may be formed into a more desirable piece, not unlike a poultry leg in appearance. Thus, Joseph H. Kelly U.S. Patent No. 2,992,924 has disclosed and claimed a method for processing the meat of the poultry wing intermediate joint containing the radius and ulna bones so as to be inverted over the humerus bone of the wing proximal joint which is initially attached to the poultry carcass. The resulting piece when cooked has an appearance substantially the same as a poultry leg, a consistency more tender, and a taste superior to that of a leg, which is considered a premium piece in the poultry industry. The resulting single-joint wing product may obviously be handled more conveniently than the original wing product in the course of eating the same.

No apparatus is in existance, however, for rapidly processing poultry wings in a substantially automatic manner whereby the labor cost involved in processing a wing into a premium poultry piece is extremely small. The apparatus hereinafter described in detail rapidly rearranges the meat on a poultry wing into a leg-like piece whereby an increasing percentage of the poultry carcass may be economically marketed as premium pieces.

SUMMARY

It is an object of this invention to process poultry wings in a substantially compeltely automatic manner whereby the appearance and even the taste of the wing member is transformed into that of a premium poultry piece.

It is a further object of this invention to provide an apparatus composed of a desirably small number of moving parts which are of simple and sturdy design while possessing the attribute of ready replaceability.

The provided apparatus, while performing in a substantially automatic manner, discards a bare minimum of the processed wings to waste as it enhances the value of the wing product discharged from the apparatus.

The provided apparatus automatically severs the distal joint of a poultry wing, strips the meat of the intermediate joint from the radius and ulna bones thereof, severs the latter bones from the wing and rolls the flesh of the intermediate joint over the humerus bone and flesh of the wing proximal joint. The latter leg-like piece is then automatically discharged from the apparatus.

DESCRIPTION OF THE DRAWINGS

FIG. 4 is an enlarged side elevational view of a portion of the apparatus illustrated in FIG. 1;

FIG. 5 is an enlarged perspective view of a turret tube such as is illustrated in FIG. 2;

FIG. 6 is a side elevational view of a turret tube illustrating the passageway therethrough in dotted lines;

FIG. 7 is a view of the larger end of the turret tube illustrated in FIGS. 5 and 6;

FIG. 8 is an exploded, fragmentary, perspective view of a worm drive shaft and associated parts employed in the apparatus of FIG. 1;

FIG. 9 is a side elevational view of the components of FIG. 8 in assembled relationship;

FIG. 10 is a fragmentary perspective view illustrating reciprocating mechanism in the apparatus of FIG. 1 which actuates the worm shaft of FIG. 8;

FIG. 11 is a view taken on line 11—11 of FIG. 9;

FIG. 12 is a fragmentary perspective view illustrating the means employed in the apparatus of FIG. 1 for translating reciprocating movement effected by a piston and rod mechanism into rotary movement, certain apparatus portions being illustrated in dotted lines;

FIG. 13 is a fragmentary side elevational view of the cutting plate and turret plate employed in the illustrated apparatus;

FIG. 14 is a sectional view taken on line 14—14 of FIG. 13; and

THE INVENTION

Figure 1:
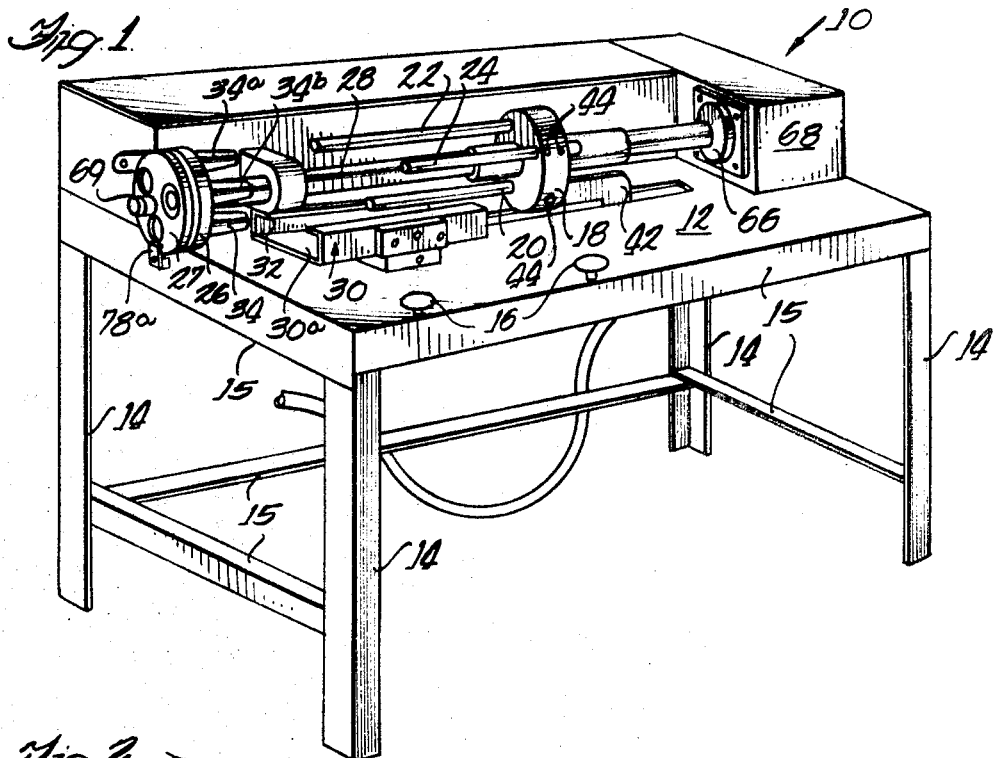
FIG. 1 is a perspective view of an apparatus made in accordance with the teachings of this invention.

Referring now more particularly in FIG. 1, an apparatus 10 made in accordance with this invention is illustrated. The apparatus is intended to process a poultry wing, generally considered one of the less desirable pieces of poultry by the consuming public, into a premium poultry piece similar to a poultry leg in appearance and superior thereto in taste.

The apparatus 10 of FIG. 1 comprises an upper planar surface 12 supported by underlying supporting members 14 which are braced by cross pieces 15. Safety buttons 16 are also shown, both of which must be actuated by the operator of the apparatus before any apparatus movement may take place. The moving parts of the illustrated apparatus are pneumatically driven to facilitate cleansing thereof, although other power means may be obviously employed, as is apparent to those skilled in the art. The spaced buttons 16 necessitate actuation by the two hands of the operator thereby assuring the location of the hands at a safe distance from near-by moving parts of the apparatus which could cause possible injury.

Figure 2:
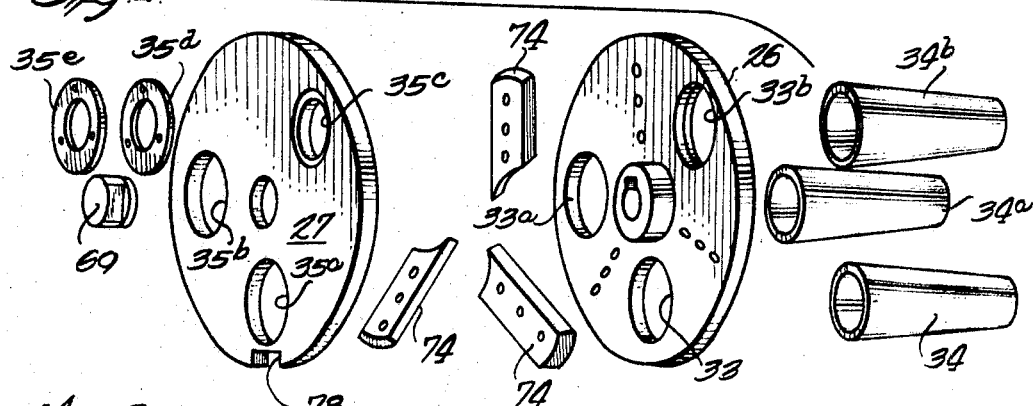
FIG. 2 is an exploded view illustrating the component parts of the rotating turret plate and stationary cutting plate employed in the apparatus of FIG. 1.
Figure 3:
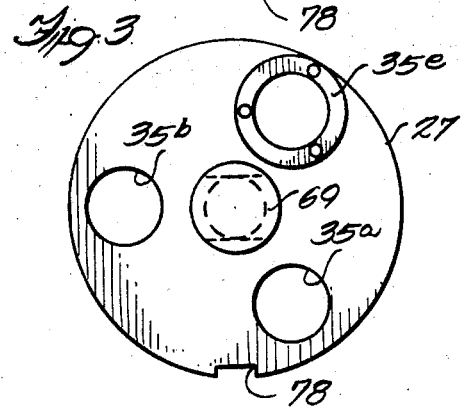
FIG. 3 is a front view of the assembled stationary cutting plate.

The machine 10 is designed to effect two primary movements: a reciprocating movement of ram carrier 18 and supported rams 20, 22 and 24, and the rotary movement of turret plate 26 more clearly seen in FIG. 2. The rams may be secured within the carrier openings by keys or locking bolts 44 or equivalent means (see FIG. 4). Turret plate 26 is rotatably driven by drive shaft 28 to which it is attached, and along which the ram carrier 18 slidably moves during its reciprocating movement.

In the normal course of processing a poultry wing, the operator places a wing in an open, inwardly-movable feeder drawer 30 (see FIGS. 1 and 12) which does not begin its inward movement away from the operator until the buttons 16 are actuated. The wing is always placed in the drawer with the distal joint pointing toward the turret plate 26. The wing is forced to assume a straight configuration when opposed stationary elongate plate member 32 is received within the C-shaped longitudinal edge portion 30a of the drawer 30. The wing is then disposed in axial alignment with a lowermost tube 34, which, like tubes 34a and 34b, is welded or otherwise suitably affixed as by a press fit to turret plate 26 so as to have the tube central longitudinal axes in alignment with the centers of the turret plate apertures 33, 33a and 33b respectively (see FIG. 2).

Figure 15:
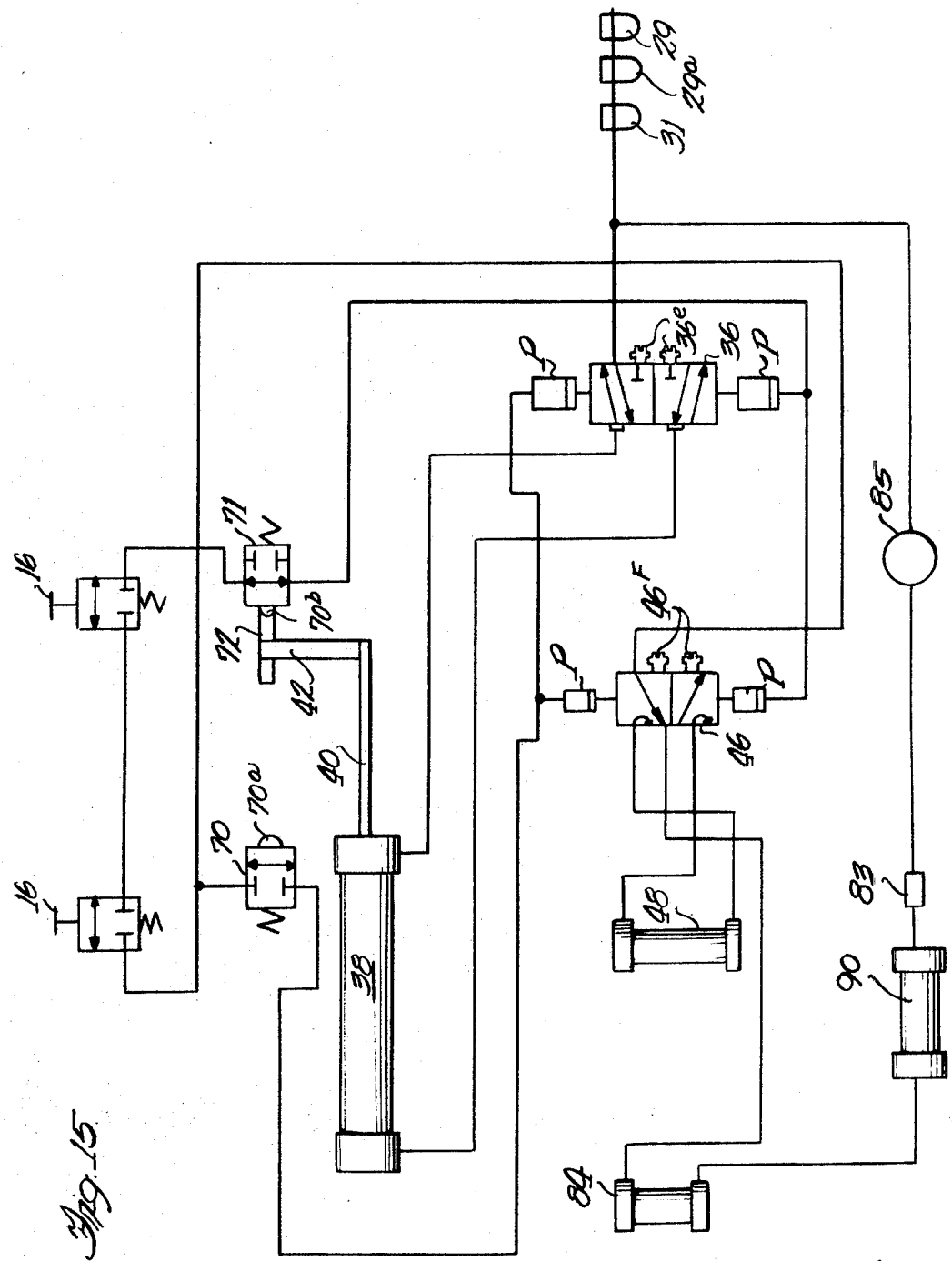
FIG. 15 is a schematic view of the pneumatic system employed in the apparatus of FIG. 1 for actuating the various moving parts thereof.

Actuation of buttons 16 allows air to shift movable pistons in a four-way valve 36 having pilot valves P at opposed ends thereof, as will be more readily apparent from the schematic diagram of FIG. 15. Valve 36 will be actuated to allow air to enter main drive cylinder 38, mounted on bracket 38b affixed to one of the apparatus cross pieces 15 (see FIG. 12), and having piston rod 40 extending therefrom. Air, prior to entering valve 36, passes through cleaner 29, filter 29a and regulator 31 (see FIG. 15). The end of the rod 40 engages a connector 42, as illustrated in FIGS. 1 and 12, which engages ram carrier 18.

Upon actuation of the apparatus 10 by the operator, the ram carrier and attached rams 20, 22 and 24 are moved toward the turret plate 26. Substantially simultaneously with the pressing of the buttons 16, control valve 46, having pilot valves P, is actuated (see FIG. 15), to pass air to retract the piston in cylinder 48 whereby the feeder drawer 30 is closed before ram 20 engages the wing therein.

As piston rod 40 of the main drive cylinder 38 moves, an attached actuating fork member 50, more clearly seen in FIG. 10, engages an adjustable stop collar 52 secured on an elongate shaft 53. The latter shaft is adapted to reciprocally move a connected rack disposed in supporting bearings 56 along an axis parallel to drive shaft 28. As a result of actuating member 50 engaging the stop collar 52, in the course of approaching the turret plate, the rack 54 will be axially moved toward the turret plate 26 while rotatably actuating a pinion 58 which will rotate freely relative to a shaft 60 on which mounted (see FIG. 8).

When the ram carrier is driven away from the turret plate, however, fork 50 will engage stop collar 37. The resulting rotatable movement of the pinion 58 is transmitted by a pawl 61 and ratchet 63 or equivalent means to the worm shaft 60 on which the pinion is mounted, and on which is also mounted for rotation therewith a worm 62. The worm rotatably drives worm gear 64 in a clockwise direction as shown in FIG. 8. The latter worm gear is keyed or otherwise suitably affixed to the main drive shaft 28 which rotatably moves turret plate 26. It will be noted from FIG. 12 that one end of the drive shaft 28 is journaled in bearings 66 and 67 secured to wall portions of housing 68 for the latter-described rack and pinion and worm drive assembly; a front bearing 65 is shown in FIG. 1.

The pawl is pivotally mounted on the pinion 58 and engages the ratchet wheel 63 having three stop surfaces 120° apart (see FIG. 8); the wheel 63 is keyed to worm shaft 60 whereby the worm shaft 60 will be rotated 120° each time piston rod 40 retracts the ram carrier from the turret. The 120° rotation of the worm shaft 60 will be transmitted to the worm 62 and in turn transmitted to the worm gear 64 resulting in a rotary movement of 120° of the turret plate 26 attached to the opposite end of drive shaft 28 to which worm gear 64 is keyed. Thus, the pawl and ratchet effect rotatable movement of the main drive shaft when the ram carrier is retracted only; forward movement of the carrier toward the turret plate results in slippage of the pawl 61 relative to the ratchet 63 and no resulting movement of the drive shaft; equivalent one-direction clutch means may be substituted for the above-described pawl and ratchet.

The movement of piston rod 40 away from the turret plate 26 is limited by actuation of a reversing valve member 71 (see FIG. 15), the actuating button 70b for which is also shown in FIG. 12. Engagement of button 70b with actuating arm 72, secured to the piston rod 40, places the control valve 36 in neutral and stops the movement of the ram carrier 18 with the drawer 30 in the open position. In the course of the ram carrier forward movement after buttons 16 are pressed, actuating arm 72 will engage stop collar 52 (see FIG. 10), thereby axially moving the stop collar 37 into proper position to be engaged by fork 50 during subsequent retraction of the carrier and assuring subsequent movement of the rack 54 the proper axial distance to effect a 120° rotation of the turret.

It will be seen from FIG. 1 that the three rams 20, 22 and 24, carried by the ram carrier 18, are of progressively-increasing length. The shortest ram 20 is adapted to axially force the wing member disposed in the drawer 30 into turret tube 34 to the extent that the distal joint of the wing protrudes through the turret plate 26 into adjacent aperture 35a of adjacent cutting plate 27 (see FIG. 2). In the course of the retracting movement of the ram carrier and attached rams above described, drive shaft 28 will be rotatably driven precisely 120° in a clockwise direction moving therewith turret plate 26 and attached turret tubes. The projecting distal joint of the wing portion disposed in turret tube 34 will be severed as the turret plate 26 rotates relative to the stationary cutting plate 27. Knives 74 attached to the turret plate 26 facilitate the shearing action with cutting plate 27 in the course of the turret rotational movement. It will be noted from FIG. 13 that the "knives" 74 function as shear bars in cooperation with the cutting plate 27. It will also be seen from FIG. 14 that the arrangement of the knives relative to the turret plate requires that the knife effective shearing edges be disposed in part over the turret plate apertures through which the poultry wings are forced by the rams.

To facilitate the movement of the drive shaft an angle of precisely 120°, a brake band 59 engages a brake drum 76 attached to the lower end of worm shaft 60 as seen in FIG. 8. Tension on band 59 is regulated by nut and bolt assembly 55. The latter dragging action assists in the stopping of the worm shaft at the precise angle desired. After turret plate 26 and attached tube 34 have been rotated 120°, tube 34 will be in alignment with aperture 35b of the stationary cutting plate 27 (see FIG. 2). It will be noted that a notch 78 is formed in the bottom edge of cutting plate 27 which is engaged by a lug member 78a affixed to the framework of the apparatus 10 (see FIG. 1) thereby assuring immobility of the cutting plate in the course of the shearing operation. Nut 69 engages the end of drive shaft 28 and assists in retaining cutting plate 27 in position.

During the subsequent wing-feeding operation which will be into the turret tube 34b, now disposed adjacent aperture 35a of cutting plate 27, the ram carrier 18 and attached ram members will be driven toward the turret plate 26 in the manner above described whereby ram 22, which is of intermediate length, will enter the turret tube 34 which will now be disposed adjacent aperture 35b of the cutting plate.

Simultaneously with the actuation of the safety buttons 16, previously described, piston rod 84a of pivotally-mounted cylinder 84 is retracted by air flow (see FIG. 12); the latter rod 84a is connected to a link 86, to which a stripper arm 88 is connected by rod 85a. Accordingly, upon inward movement of piston rod 84a, stripper arm 88 is downwardly pivoted between the turret 26 and stationary cutting plate 27 to the vicinity of aperture 35b of the cutting plate 27. The interval between the turret and cutting plate is assured by the knives 74 which also function as spacers. A hard rubber edge 88e on arm 88 is positioned during movement of the rams into the turret tubes so as to abrade against the intermediate joint of a wing when such wing is axially moved from tube 34a between the arm and knife partially disposed over the aperture. Piston rod 84a is thus retracted into cylinder 84 as carrier 18 approaches turret plate 26. Axial movement of the ram arm 22 into the turret tube 34, when disposed in alignment with aperture 35b of the cutting plate 27, will, therefore, cause the flesh surrounding the radius and ulna bones of the intermediate wing joint to be scraped from the bones by the arm 88 and a knife 74 and compacted into a flesh mass as the wing is axially urged relative to the stripping arm 88 and knife.

As will be most clearly seen from FIGS. 5 and 6, each turret tube has an enlarging internal diameter as its connection with the turret plate is approached. Thus, in the course of axial movement of the ram 24, the poultry wing portion disposed in alignment with aperture 35b of the cutting plate will be axially moved until the two bones of the intermediate wing joint are disposed exteriorly of the turret tube, between the rotating turret plate 26 and the cutting plate 27. As a result, when the ram carrier is retracted and the turret plate 26 rotated another 120°, the two bones of the intermediate wing joint will be severed from the wing portion disposed within turret tube 34. Since the piston rod 84a is formed to extend during movement of the ram carrier 18 from turret plate 26, the stripper arm 88 is pivoted by means of rod 85a (see FIG. 12) upwardly thereby providing no obstacle when the turret plate 26 rotates 120°.

Simultaneously with the processing of the wing portion disposed in tube 34, a new wing member will be forced into turret tube 34b which is now in alignment with aperture 35a of the cutting plate as a new wing is fed into the apparatus.

The forward motion of the ram carrier and attached rams toward the turret plate 26 is limited by switch 70a of normally-closed valve 70. The switch will engage actuator arm 72 attached to the piston rod 40 of cylinder 38 as the latter rod is retracted and the carrier moved toward the turret plate. Valve 70 will be actuated to move the four-way valve 36 so as to reverse the air flow in the circuit. In the course of such reversal, air will now enter main drive cylinder 38 to extend piston rod 40 and move the carrier away from the turret plate. Simultaneously, air will enter cylinder 48 of feed drawer 30 so as to open the same, and air will enter cylinder 84 so as to extend piston rod 84a, moving stripper arm 88 upwardly as the turret plate prepares to rotate relative to the stationary plate 27.

As will also be noted from FIG. 15, actuating arm 72, connected to piston rod 40, engages button switch 70b of normally-closed valve 71 in the course of being extended from the cylinder 38. Valve 71 will then be opened preventing movement of any component of the apparatus 10 until the safety buttons 16 are actuated whereby a pneumatic circuit is established permitting reverse movement of the ram carrier toward the turret whereby piston rod 70 is retracted into cylinder 38. In the course of such retraction effected by manual engagement with safety buttons 16, the stripper arm 88 is moved into desired position relative to the cutting plate and turret plate, and the drawer 30 is closed substantially instantaneously so that the new wing which has been fed into the drawer is in desirable axial alignment with the lowermost turret tube of the turret plate enabling the same to be engaged by the lowermost ram 22.

Adjustable stop screw 89 mounted in block 89b (see FIG. 12) determines the end limit of the stripper arm downward movement whereby the stripper arm is desirably positioned relative to the ulna and radius bones forced through the aperture 35b of the cutting plate in the manner previously described. The adjusting screw 89 prevents inadvertent fracturing of the bones of the intermediate joint as a result of an impact with the stripper arm. Block 89 may be supported by any suitable means to the apparatus housing as illustrated in FIG. 12.

Referring once again to FIG. 15, it will be noted that surge tank 90 is in series with cylinder 84 which actuates the stripper arm 88. When a wing is being engaged by the stripper arm and the arm forced to move up as the bones of the wing joint are moved past, air surges back to the surge tank 90 which functions as an air cushion or spring. Thus, in the course of the stripping operation of the flesh from the intermediate wing joint, the stripper arm is able to flex in the vertical plane as the bones move beneath its scraping edge.

Referring to FIG. 15, it will be seen that a regulator 85 maintains the pressure within surge tank 90 and cylinder 84 at a desirably lesser pressure than the 80 p.s.i. normally employed in the main drive cylinder. Check valve 83 prevents air from migrating from the high pressure to the low pressure portion of the system. In the course of processing certain birds such as fryers, the stripper arm pressure in cylinder 84 need only be about 40 p.s.i. although the pressure in the remainder of the system is 80 p.s.i. In processing hens, the stripper arm pressure may also be 80 p.s.i. Ready fracturing of bones is more likely to occur in processing frozen poultry. Proper arm pressure will avoid this undesirable occurrence. Such regulation may be readily accomplished by one reasonably skilled in the art.

In the final station of the turret plate, the wing portion disposed in turret tube 34 will be indexed adjacent aperture 35c of the stationary cutting plate 27 (see FIG. 2). In the course of forward movement of the ram carrier 18 and attached rams, the longest ram arm 24 will enter turret tube 34 when the latter is disposed in alignment with aperture 35c of the cutting plate. Said ram arm 24 forces the flesh mass accumulated in the larger end of the turret tube 34 to unfold around and to be inverted with the skin innermost about the proximal joint of the poultry wing remaining in the turret tube as the same is axially moved through aperture 35c. A rubber annulus 35d, secured in place by retainer 35e, is disposed in a recess about aperture 35c to engage and facilitate rolling back of the flesh.

It is, of course, appreciated that chutes are appropriately disposed so as to receive the distal wing portion which is severed and discarded to waste and which may be employed as fertilizer or the like; a similar chute may be disposed to receive the final wing product, in which, as above described, the meat of the intermediate joint is inverted over the meat and humerus bone of the proximal wing joint. Also, clamps and brackets such as the split ring clamp 77 of FIGS. 8 and 9 comprising a part of the ratchet assembly may be employed where desired to retain various components in desired relationship.

An apparatus has been described which automatically severs a distal wing joint and scrapes the flesh from the intermediate wing joint rolling it back and inverting the same over the proximal wing joint so as to form a premium poultry piece having the appearance of a leg member and also having a taste superior to a leg member. It will be appreciated that in the course of inverting the flesh of the proximal joint of the wing, the skin which was initially disposed over the wing intermediate joint is now disposed innermost so as to be unnoticeable. The taste, however, is quite pleasing, it having been determined that it is the appearance of the skin rather than the taste which had previously rendered wing portions of poultry less desirable than other premium parts such as breasts and legs.

It is seen from the foregoing that once the wing has been inserted into the feeding drawer, the provided apparatus automatically processes the wing member into the final desired piece which possesses all of the characteristics of a premium poultry piece.

Wings of like poultry are substantially standard in length making it unnecessary to make adjustments in the normal course of apparatus use. However, assuming wings of different poultry having a different length are processed by a single machine, obviously the ram penetration into the tube lengths may be readily adjusted by appropriately positioning the extension of the rams from the carrier 18. In the event it becomes necessary or desirable to adjust the speed of the reciprocal movement of ram carrier 18, as when wings of different poultry are processed, such adjustment may be effected by changing the openings in exhaust valves 36e of valve 36 (see FIG. 15). Valves 36e regulate the speed at which air is allowed to escape from main drive cylinder 38 during the strokes of the piston in cylinder 38 and also serve as silencers.

Similar exhaust valves 46f are attached to valve 46 which normally need not be adjusted after an initial setting. It is apparent that the tubes 34 may be made to readily detach from the turret 26 as by a threaded engagement or the like to accommodate the flesh of the particular poultry being processed whether broilers, hens, duck, turkey, etc. Different turret plates with different size tubes may be readily exchanged on an existing machine eliminating the necessity of replacing a number of individual tubes. An adjusting bolt 41 threadedly engaged to a tapped aperture of collar 39 fixedly attached to turret plate 26 (see FIG. 4) serves to effect proper positioning of the turret plate relative to the adjacent cutting plate 27 thereby assuring optimum shearing action between the latter plates in the course of turret rotation.

While particular embodiments of this invention have been shown and described, it will be understood, of course, that the invention is not limited thereto since modifications may be made by those skilled in the art, particularly in light of the foregoing teachings. Therefore, it is contemplated by the appended claims to cover any such modifications as incorporate those features which may be said to constitute the essential features of these improvements, within the true spirit and scope of the invention.

What is claimed is:

1. An apparatus of the type described for processing a poultry wing in which a distal joint is connected to a proximal joint containing one bone by means of an intermediate joint containing two bones, comprising: means of general tubular configuration for snugly receiving a poultry wing with the distal joint of said wing disposed exteriorly of the receiving means, means in operative relationship with the receiving means for severing said distal joint from the remainder of said wing, means engageable with said proximal joint and movable into said receiving means for forcing said intermediate joint exteriorly of said receiving means through one end thereof, means disposed adjacent said one end for stripping the flesh of said intermediate joint from said joint two bones and forming a mass adjacent the proximal joint during operation of the forcing means, means for engaging said proximal joint and axially moving the same into the mass formed by the flesh of said intermediate joint whereby said mass is disposed about the flesh of said proximal joint, and resilient stop means disposed adjacent said one end of said receiving means against which said mass is urged in the course of being formed about said wing intermediate joint.

2. Apparatus of the type described for processing a poultry wing in which a distal joint is connected to a proximal joint containing a single bone by means of an intermediate joint containing two bones, comprising: generally tubular members which are movably mounted, a plurality of reciprocating ram means for entering said members and extending theretinto varying distances, a first one of said ram means being adapted to force a poultry wing into said members whereby the wing distal joint protrudes exteriorly thereof, a second of said ram means being adapted to enter said members and force the bones of the intermediate joint of a poultry wing exteriorly of said cylinder, stripping means disposed about the exit end of a tubular member entered by said second ram means for stripping the flesh of the intermediate joint from from the two bones thereof in the course of movement of said second ram means, and forming said flesh into a mass adjacent said intermediate joint, a third ram means adapted to move into said tubular members for engaging and axially moving said proximal wing joint relative to said mass of flesh whereby said flesh is inverted about the intermediate wing joint, and means resisting axial movement of said mass of flesh while allowing passage therethrough of said proximal joint during said axial movement.

3. In an apparatus for processing a poultry wing having a terminal joint spaced from a proximal joint having a single bone therein by means of an intermediate joint having two bones therein, the combination comprising: severing means, means for retaining a wing in desired position whereby the terminal joint thereof may be severed from the remainder of said wing by said severing means, means engaging the distal terminus of the wing proximal joint and axially moving said joint and attached intermediate joint, means for stripping the flesh from said intermediate joint and forming the same into a mass adjacent said proximal joint, the stripping means slidably engaging the two bones of the intermediate joint during said axial movement; and means for effecting relative movement between said flesh mass and said proximal joint whereby the meat of said intermediate joint is inverted over said proximal joint.

4. An apparatus of the type described for processing a poultry wing in which a distal joint is connected to a proximal joint by an intermediate joint, the combination comprising: means for severing the distal joint of a poultry wing from the remainder of said wing, means engageable with the flesh covering the intermediate joint for forcing the flesh covering the bones of the intermediate joint into a mass adjacent the connection between said intermediate joint and said proximal joint, and means engageable with said mass for forming the mass of flesh of the intermediate joint over the flesh of the proximal joint whereby the flesh of said intermediate joint is inverted over the flesh disposed on the proximal joint.

5. An apparatus for preparing fowl wings comprising: a plurality of ram arms, a plurality of retainer tubes opposite the ram arms, a means intermediate the ram arms and the retainer tubes for positioning poultry wings in alignment with one of said arms and said tubes, a retainer tube carrier apertured to permit passage of poultry wings from said tubes therethrough, a shearing member disposed adjacent said retainer tube carrier and having apertures therein to permit passage of poultry wings therethrough, a stripping arm movable to a position adjacent said retainer tube carrier and said shearing member to retain the flesh of said poultry wings in said retainer tube carrier and retainer tubes as the bones of said poultry wings enter said shearing member, and a resilient means on said shearing member disposed about at least one of said apertures therein to fold flesh from the poultry wings over end portions of said wings as said end portions are forced out of said shearing member by the ram arms.

6. In an apparatus of the type described, a tubular member having a passageway therethrough for use in processing a poultry wing comprising: a distal joint separated from a proximal joint by means of an intermediate joint; said member passageway having an enlarging internal diameter as one end of said passageway is approached, means for stripping the flesh of the intermediate joint from the bones of the intermediate joint as the bones of said intermediate joint are forced past the stripping means through the end of the tubular member having the greater diameter and forming said flesh into a compact mass in the tubular member end having the larger diameter, and means for exerting an axial thrust on the distal end of a proximal wing joint until the bones of said intermediate joint are disposed exteriorly of said tubular member.

7. The apparatus of claim 6 in combination with means for severing the bones of the wing intermediate joint from the remainder of the wing disposed in said tubular member disposed in operative relationship with said tubular member, and means for axially moving said wing proximal joint relative to the compact mass whereby the flesh of the intermediate joint is inverted over said proximal joint.

8. In an apparatus for processing a poultry wing, the combination comprising: generally tubular means for receiving poultry wings, rotatable turret means on which said tubular means are mounted movable into a plurality of positions, reciprocating ram means for axially moving poultry wings in each of said tubular means in each of said plurality of positions, means for severing portions of said poultry wings disposed exteriorly of said tubular means in the course of the movement of said turret means, and means for connecting said ram means and turret means whereby each reciprocal movement of said ram means rotates said turret means into a new one of said plurality of positions.

9. In an apparatus for processing a poultry wing, the combination comprising: means for maintaining in fixed position a wing comprising a terminal joint spaced from a proximal joint having a single bone by means of an intermediate joint having two bones, the combination comprising: means for maintaining said wing in fixed position, means for severing the distal joint of said wing from the remainder of said wing while in said fixed position, stripping means for removing the flesh of the wing intermediate joint and forming the same into a compact mass while scraping the bones of said intermediate joint, means engaging said proximal joint for effecting axial movement of said wing intermediate joint and attached proximal joint relative to said stripping means, and means for axially moving the proximal joint relative to said compact mass of flesh stripped from said intermediate joint whereby said flesh is inverted over said proximal joint.

10. The apparatus of claim 9 in which said stripping means engages substantially the entire periphery of said intermediate joint whereby said mass is a continuous tubular mass of flesh connected at one end to said proximal joint.

11. An apparatus for processing a poultry wing in which a distal joint is connected to a proximal joint containing one bone by means of an intermediate joint containing two bones, comprising: means of general tubular configuration for snugly receiving a poultry wing with the distal joint of said wing disposed exteriorly of the receiving means, means in operative relationship with the receiving means for severing said distal joint from the remainder of said wing, means engageable with said proximal joint and movable into said receiving means for forcing said intermediate joint exteriorly of said receiving means, means disposed adjacent said receiving means for stripping the flesh of said intermediate joint from the two bones therein and forming a mass of said flesh adjacent the proximal joint during operation of the forcing means, and means for engaging said proximal joint and axially moving the same into the mass formed by the flesh of said intermediate joint whereby said mass is disposed about the flesh of said proximal joint.

12. An apparatus for processing a poultry wing in which a distal joint is connected to a proximal joint containing one bone by means of an intermediate joint containing two bones, comprising: a tube for snugly containing the proximal and intermediate joints of said wing, a knife adjacent to the tube for severing said distal joint and said two bones of the intermediate joint from the proximal joint, a ram engageable with the proximal joint and receivable in said tube for forcing said intermediate joint through the tube, and a yieldably-disposed blade intermediate the tube and the knife cooperatively arranged therewith for stripping the flesh of said intermediate joint from said two bones thereby forming a compact flesh mass in an end portion of said tube.

13. The apparatus of claim 12 in combination with a cutting plate disposed adjacent said tube and apertured so as to receive therethrough bones forced exteriorly of said tube by said ram, and means for effecting relative movement between said cutting plate and said tube.

14. In an apparatus substantially as described for processing a poultry wing having a terminal joint connected to a proximal joint by means of an intermediate joint, a tubular member having a central passageway enlarging from an open entrance end limit disposed at one end of said tubular member through which a wing enters said tubular member to an open discharge end disposed at an opposite end of said tubular member through which a wing exits said tubular member; the end portion of said central passageway adjacent the discharge end being of adequate size to receive the flesh of the intermediate joint in a mass disposed adjacent to the proximal wing joint after said flesh has been scraped into continuous tubular form from said intermediate joint as the bones thereof are forced exteriorly of said tubular member, and means disposed adjacent the discharge end of said tubular member for scraping flesh from the intermediate wing joint.

15. In a poultry wing processing apparatus substantially as described, a fixed cutting plate having spaced apertures, and an apertured rotatable turret plate disposed in parallel relation with said cutting plate; shear bars disposed over a portion of the apertures of said turret plate interposed between said turret plate and said cutting plate, all of the apertures of said cutting plate and turret plate being in alignment when any two apertures thereof are aligned whereby a poultry wing extending through said turret plate and said cutting plate is sheared in a plane disposed between that of said cutting plate and that of said shear bars upon rotatable movement of said turret plate, and means attached to said turret plate for maintaining poultry wings in fixed position while extending through said turret plate and cutting plate apertures.

References Cited
UNITED STATES PATENTS

| | | | |
|---|---|---|---|
| 2,992,924 | 7/1961 | Kelly | 17—45 X |
| 3,216,056 | 11/1965 | Segur. | |
| 3,233,282 | 2/1966 | Segur | 17—45 |

LUCIE H. LAUDENSLAGER, Primary Examiner

U.S. Cl. X.R.

17—1